(12) United States Patent
Lam (10) Patent No.: US 8,051,107 B2
(45) Date of Patent: Nov. 1, 2011

(54) METHOD AND DEVICE FOR CREATING RELATION-TYPE FORM DATABASE

(76) Inventor: Cham Ping Lam, Kowloon Tong (HK)

( * ) Notice: Subject to any disclaimer, the term of this patent is extended or adjusted under 35 U.S.C. 154(b) by 500 days.

(21) Appl. No.: 12/096,016

(22) PCT Filed: Dec. 6, 2007

(86) PCT No.: PCT/CN2007/003473
§ 371 (c)(1),
(2), (4) Date: Jun. 3, 2008

(87) PCT Pub. No.: WO2009/070933
PCT Pub. Date: Jun. 11, 2009

(65) Prior Publication Data
US 2010/0223298 A1 Sep. 2, 2010

(51) Int. Cl.
*G06F 17/30* (2006.01)
(52) U.S. Cl. ............... 707/803; 707/E17.005; 707/953; 707/954

(58) Field of Classification Search .................. None
See application file for complete search history.

(56) References Cited

U.S. PATENT DOCUMENTS

| | | | | |
|---|---|---|---|---|
| 6,243,721 | B1 * | 6/2001 | Duane et al. | 715/234 |
| 7,477,410 | B1 * | 1/2009 | Klein | 358/1.15 |
| 2005/0063596 | A1 * | 3/2005 | Yomdin et al. | 382/232 |
| 2005/0094207 | A1 * | 5/2005 | Lo et al. | 358/1.18 |
| 2007/0294496 | A1 * | 12/2007 | Goss et al. | 711/163 |

* cited by examiner

*Primary Examiner* — Shyue Jiunn Hwa
(74) *Attorney, Agent, or Firm* — J.C. Patents (57) ABSTRACT

The present invention provides a method and device for creating a relation-type form database, the method comprising: displaying an existing form as a background image on a screen; drawing frames on predetermined positions of the background image with an operation means to create multiple data areas; and creating parallel relations and/or cross relations among the multiple data areas to form a relation-type database of the existing form. The operations of the present invention are easy and low-cost, which enable widely spreading of the application of databases.

9 Claims, 5 Drawing Sheets

METHOD AND DEVICE FOR CREATING RELATION-TYPE FORM DATABASE

FIELD OF THE INVENTION

The present invention relates to a method and device for creating a relation-type form database, and particularly to a method and device for creating a relation-type form database using an existing form.

BACKGROUND OF THE INVENTION

At the present, the technology of the common application software or databases, such as Oracle, Microsoft's SQL and Access etc., are based on the behindhand hardware environment of 1980's. At that time, there are no displays with high resolution, and scanners are not widespread either. Creation of a database structure has to be limited by a character terminal, since the database structure is described in words. With development of tens of years, however, the condition for creating the database structure remains unchanged, and the creation of all database structures have to be subjected to a series of complex definitions or assignments. A programmer has to program the inputs and outputs of data with programming languages. The database's maintenance needs the source codes of the programs provided by the original program designer so as to maintain or update the software of the database.

With spreading of computers, many enterprises have realized the importance of creating the company databases. The creation of a conventional database usually utilizes Oracle, MS SQL . . . , causing demands of purchasing specific database software, and the construction of the database and the maintenance in the course of system life must be performed by professionals. Thus, the cost is high, and it is a burden of the intermediate or small scale enterprises.

The conventional approach of creating a database continues to be used up to now, and the dramatic overheads result in requirements for database system with convenience, high efficiency and low cost.

SUMMARY OF THE INVENTION

The present invention is proposed in view of the above defects in the prior art. In the present invention, a development platform of a relation-type form database application is combined with giant databases, and the development is based on the advanced computer hardware environment on the 21st century. Since such advanced hardware like a scanner with high resolutions, digital technique with high resolutions, and so on, can be fully applied in the invention, when creating a database, the user needs only to scan a form background into a computer as a screen background. The system can automatically create the structure of the database, and paths such as inputs and outputs of the data by means of easy operations, such as by using a mouse to draw frames on the form image as the background. Further, correspondences among the forms can be created by simple operations on the screen with the mouse. The applications and databases developed based on the present invention require no professionals, and the maintenance during the life of the software requires no source codes of programs.

According to one aspect of the present invention, a method of creating a relation-type form database is provided, the method comprising: displaying an existing form as a background image on a screen; drawing frames on predetermined positions of the background image with an operation device to create multiple data areas (also referred to as field); and creating parallel relations and/or cross relations among the multiple data areas.

In an embodiment of the invention, the data areas are empty areas to be filled where the content to be filled is at least one of text, number, pattern, function, dynamic image, and movie.

In an embodiment of the invention, the forms contains at least one parent form and children forms thereof in which the data areas where the same record is recorded are assigned the same page number.

In an embodiment of the invention, the step of creating the parallel relations comprises: constructing a set of dynamic parallel moving pointers for a specified data area, applying a relation transform to each of the dynamic parallel moving pointers where the relation transform acts between the parent form and the children forms thereof with the same page number, subjecting the area value of the data area to the relation transform, and transferring it to another data area, wherein when page numbers are different, the dynamic parallel moving pointers transfer in parallel the relation transform to different pages.

In an embodiment of the invention, the step of creating the cross relations comprises: constructing a set of dynamic index pointers with the same value for a specified data area, applying a relation transform to each of the dynamic index pointers, wherein the dynamic index pointers subject the area value of the data area to the relation transform, and transferring it to another data area of respective forms in different parent forms and the children forms thereof or of respective forms with different page numbers in the same parent form, and when index values are different, the dynamic index pointers transfer the relation transform to different pages (records).

In an embodiment of the invention, the background image is obtained by scanning the existing form, or it is an image file stored in a storage device, and the format of the image file is at least one of BMP, JPEG, TIFF, PNG, GIF, and PDF.

According to another aspect of the present invention, a device for creating a relation-type form database is provided, the device comprising: a display means for displaying an existing form as a background image on a screen; and an operation means for drawing frames on predetermined positions of the background image to create multiple data areas, and creating parallel relations and/or cross relations among the multiple data areas.

In an embodiment of the invention, the data areas are empty areas to be filled where the content to be filled is at least one of text, number, pattern, function, dynamic image, and movie.

In an embodiment of the invention, the form contains at least one parent form and children forms thereof in which the data areas where the same record is recorded are assigned the same page number.

In an embodiment of the invention, the operation means is further configured to construct a set of dynamic parallel moving pointers for a specified data area, apply a relation transform to each of the dynamic parallel moving pointers where the relation transform acts between the parent form and the children forms thereof with the same page number, subject the area value of the data area to the relation transform, and transfer it to another data area, wherein when page numbers are different, the dynamic parallel moving pointers transfer in parallel the relation transform to different pages (records).

In an embodiment of the invention, the operation means is further configured to construct a set of dynamic index pointers with the same value for a specified data area, apply a relation transform to each of the dynamic index pointers, wherein the dynamic index pointers subject the area value of the data area to the relation transform, and transfer it to another data area of respective forms in different parent forms and the children forms thereof or of respective forms with different page numbers in the same parent form, wherein when index values are different, the dynamic index pointers transfer the relation transform to different pages (records).

In an embodiment of the invention, the operation means is at least one of mouse, keyboard, and tablet.

It can be seen from the above that the present invention provides a new development platform for a new relation-type existing form database applications, which is distinctive from the conventional database software. The applications of the present invention are based on the development platform for Form-World relation-type form database applications, and developed in the hardware environment of the 21st century when the hardware includes displays with high resolutions and scanners with high resolutions. The creation of the databases is simple and it is easy to use. The user may scan the existing forms into a computer as the screen background, and directly create a relation-type database by simple operations. Any computer user may create databases as necessary, individually, without requirements for professional knowledge. The compression ratio of files in the databases may be four times than that of PDF files. In addition to possessing giant databases, the application development platform may connect to other databases such as MS SQL, Oracle, Access, Excel, Dbase II/III, etc, so that the situation where the conventional database are specific to those "noble" and large enterprises is changed, and applications of databases will be widely spread.

BRIEF DESCRIPTION OF THE DRAWINGS

The above and/or other aspects and advantages of the present invention will become more apparent by the following detailed description made the present invention in conjunction with figures in which.

DETAILED DESCRIPTION OF THE PREFERRED EMBODIMENTS

The particular embodiments of the present invention are described with respect to the figures below.

In the present invention, what a user will do is only to scan an existing form, such as a form that has been printed on a paper sheet, into a computer as a screen background, to draw frames, which is blocks, circles or any other shapes, on arbitrary positions on the background form displayed on the screen with a mouse (or any other input device such as a keyboard, a tablet and so on), and to input at least one of a text, a number, a pattern, a function which may define operations of adding, subtracting, multiplying, dividing and the like, a dynamic image and a movie in the frames. Then, the system can automatically fill the results of the operations into specified data areas (parallel relation area or cross relation area). Meanwhile, the system may automatically generate a statistical report of respective types of data, or create a flow tracking and real-time monitoring system for the operations of an enterprise as the user demands, and simply speaking, to directly create a relation-type database, or in other words, a mini-EPR system.

In the present invention, the relation-type database is created by using parallel relations and cross relations. A relation database with parallel relations and cross relations may be applied to a relation-type existing form application system. With the invention, the relation-type existing form application system may be created quickly without programming by using any program languages.

Definition of form set: the form set is composed of a plurality of forms containing various usages, attributes and data. The above mentioned forms may be resulted from images scanned from the existing forms by a scanner and stored in a computer, or resulted from hard copies of computer images, or image files of forms that have been stored in the storage of the computer, for example, such as BMP, JPEG, TIFF, PNG, GIF, PDF, and the like. In the specification, the word "form" is applicable to the form set.

Definition of page, page number, and array of pages: each form (form set) is further composed of a parent form and a plurality of children forms which are extensions of the parent form or themselves. The parent form and its children forms may have different attributes. Each form may record different data, and a set of data with the same usage recorded in each form is referred to as a page which is a record in a common database (the meaning of "page" used in the specification including a picture is limited to this explanation). Numbers are assigned to forms (the parent form and its children forms) with a plurality of different data with the same usage, and are referred to as the page number. In the parallel relations, the fields (data areas) with relations between the parent form and the children forms are assigned the same page number; and in the cross relations, between a parent form and the children forms thereof and another parent form and the children forms thereof, the fields (data areas) with relations are assigned the same page number or different page numbers. The plurality of different data recorded in forms with the same usage is also referred to as an array of page.

Figure 1:
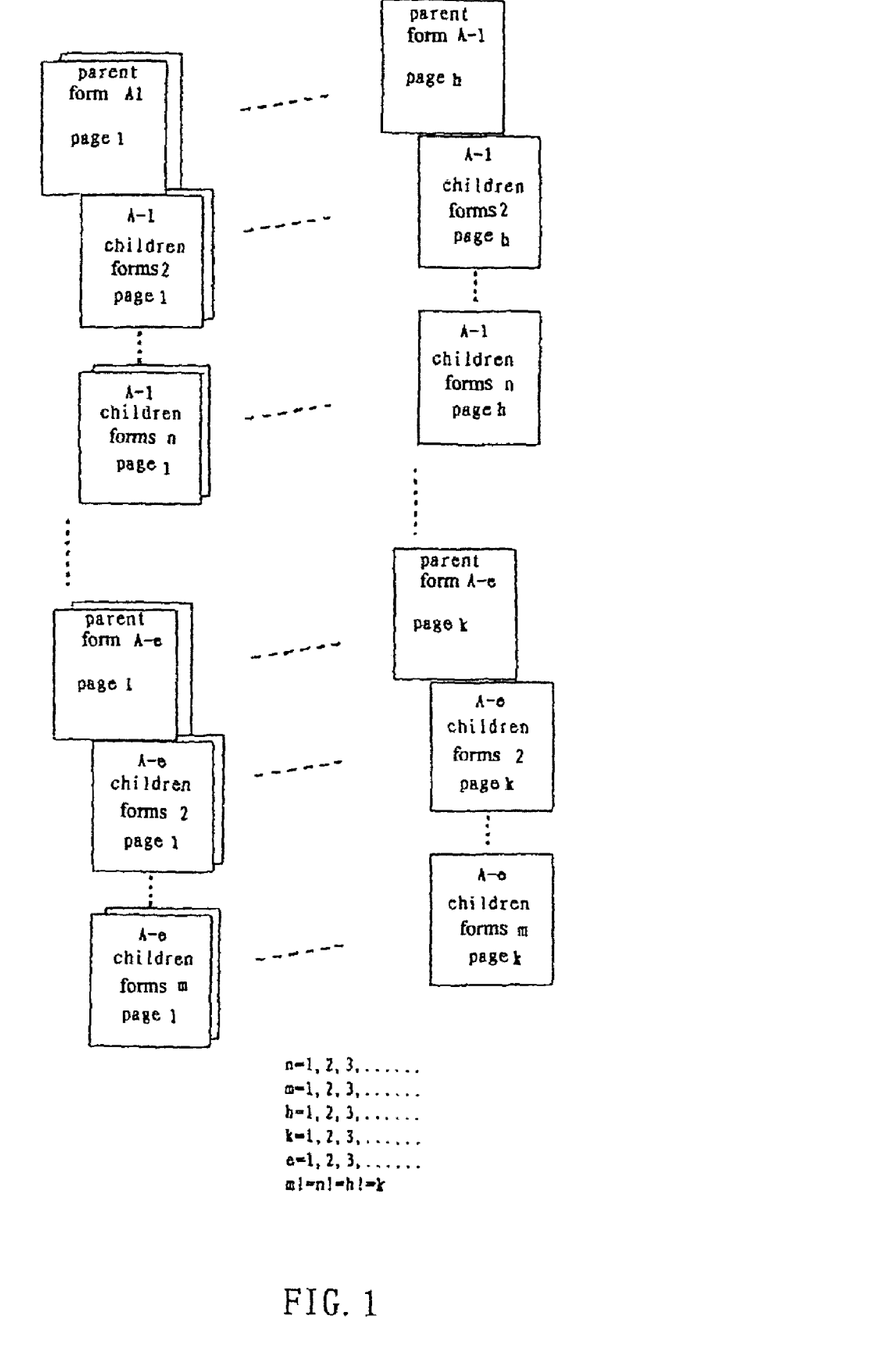
FIG. 1 is a view showing a form set according to an exemplary embodiment of the present invention.

A usual form of the form set is shown in FIG. 1, which comprises several parent forms and their children forms with different usages, or parent forms and their children forms with the same usage. The parallel relations exist in the parent form and its children forms with the same usage. The cross relations exist in the parent form and its children forms with different usages.

As shown in FIG. 1, the form set contains a parent form A-1 through parent form A-e. The parent form A-1 further contains its children forms 2 to n, and the parent form A-1 and its children forms 2 to n are divided into the $1^{st}$ to h-th pages, and are referred to as having forms. The parent form A-e further contains its children forms 2 to m, and the parent form A-e and its children forms 2 to m are divided into the 1st to k-th pages, and are referred to as having k forms. The parent form A-1 and its children forms 2 to n, . . . , the parent form A-e and its children forms 2 to m construct a form set of the present invention as an example.

In the form set shown in FIG. 1, for example, the 1st page of the parent form A-1 and the 1st pages of its children forms 2 to n have the same page number, . . . , the k-th page of the parent form A-e and the k-th pages of its children forms 2 to m have the same page number. In the figure, n=1, 2, 3, ...; m=1, 2, 3, ...; k=1, 2, 3, ...; h=1, 2, 3, ...; e=1, 2, 3, ..., where n≠m≠k≠h≠e.

Definition of usage: forms are the most direct and effective approach to record the processes and results of activities in human social activities. Forms for different usages will be designed for recording the processes and results of various activities. For example, a usage of an annual report form on tax is to record every income and payout in the year. A usage of archives form of employees during the incumbency is to record the behaviors, achievements and incomes of the employees in every year. Obviously, the usages of the annual report form on tax and the archives form of employees during the incumbency are different. The usages of the forms are usually described in the forms in form of text. For example, the annual report form on tax will have textual description such as "annual report form on tax". The archives form of employees during the incumbency will have textual description such as "archives form of employees during the incumbency".

Definition of data area, and array of data area: there are multiple areas in a form, each of which is an empty area to be filled, surrounded by a frame of quadrangle or other shapes and is referred to as a data area, or a field in the invention. The data area may be formed directly on the screen of computer display by operations of input devices such as a mouse. The content (data) to be filled in the data area may be at least one of text, number, pattern, function, a dynamic image of multimedia, a movie, and the like. Each data area may record data of each page of form in this data area. Data in each page relating to this data area compose an array of this data area.

Definition of attribute: the form attribute indicates the attributes such as size of contour and color of the form, physical size of positions of data areas in the form, usage of the data areas, characteristic of the data areas, and so on.

Definition of parallel relation: in the parent form and its children forms with the same page number, the data areas in the forms have parallel relations, that is, a value of a certain data area is a result of the transform from another or other areas. This kind of relation always exists in the array of data areas throughout the parent form and its children forms with the same page number. When the page numbers are different, this kind of relation still exists in the parent form and its children form with the same page number. Since this relation may exist in parallel with different page numbers, it is called parallel relation.

Implementation of the parallel relation: a set of dynamic parallel moving pointers are constructed for some or a certain data areas and a relation transform (for example a function operation) is applied to each of the dynamic parallel moving pointers. The parallel moving pointers move with different values of the page number, and with movements of the parallel moving pointers, area values of the data areas are subjected to the relation transform and conveyed to another data area. The data area derived from the above relation transform is referred to as a parallel relation area. This kind of parallel relation may only be created in all the forms of one parent form (including the parent form and its children forms), and the created parallel relation will remain throughout the array of the data areas.

Figure 2:
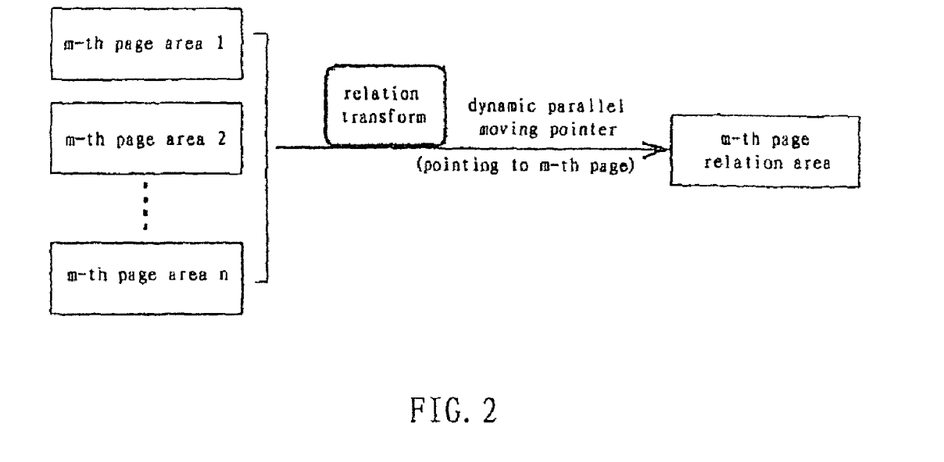
FIG. 2 is view showing how to implement parallel relations according to an exemplary embodiment of the present invention.

An implementation of the parallel relation is shown in FIG. 2. For example, a relation transform is applied to area 1, area 2, ..., area n in the m-th pages of a parent form and its first children forms. This relation transform, for example, may be to sum the area values of each area of the area 1, area 2, ..., area n. Then, the result is pointed to a certain data area in the m-th page of the second children form of the parent form, so that the area value of this data area is the sum of the area values of each area of the area 1, area 2, ..., area n. At this time, this certain data area is referred to as the parallel relation area. When the page numbers are different, the pointer points the relation transform to different pages. Thus, a parallel relation is created among the parent form and its first and second children forms.

Figure 3:
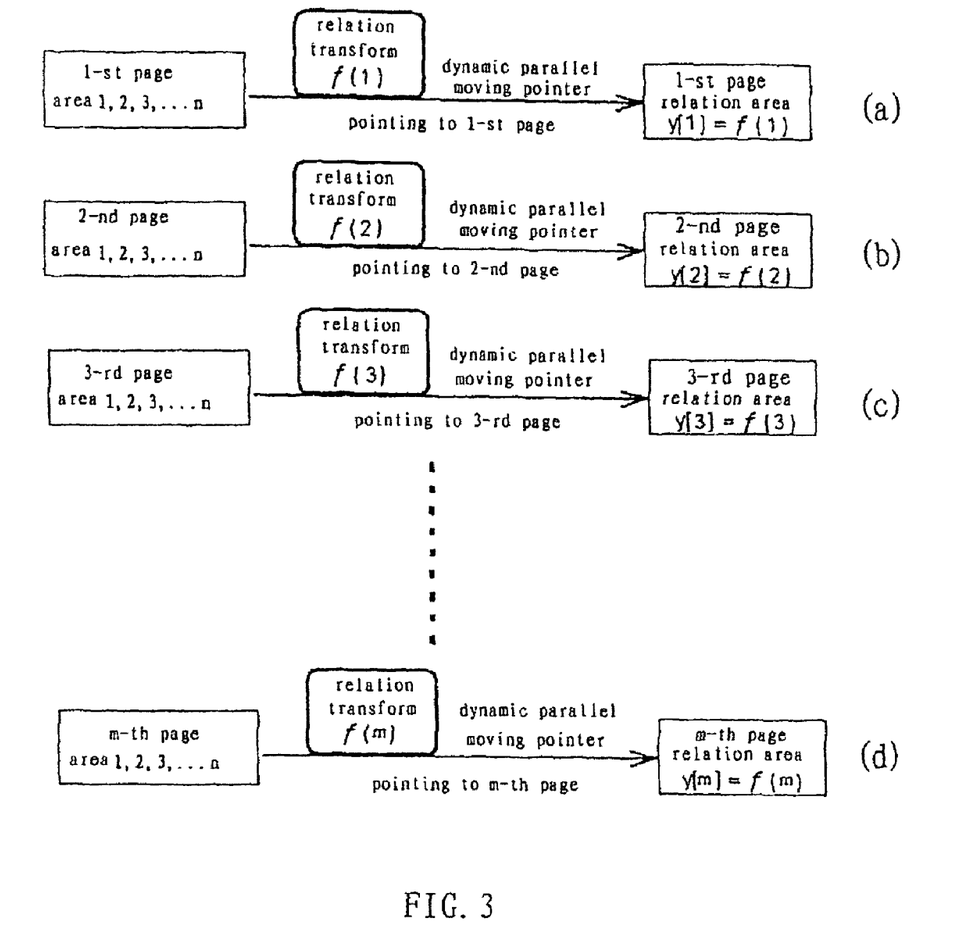
FIG. 3 is a view for exemplarily explaining the implementation of the parallel relations of the present invention.

Below, the implementation of the parallel relation of the present invention will be described in details with reference to FIG. 3. FIG. 3 is a view for exemplarily explaining the implementation of the parallel relations of the present invention.

In the invention, let the relation transform be f(area 1[m], area 2[m], ..., area n[m]), and simplified as f(m). Let the relation area value be y[m].

Then, y[m]=f(area 1[m], area 2[m], ..., area n[m]), and simplified as y[m]=f(m), where m=1, 2, 3, 4, ..., which are the page numbers.

The area n[m] is the area value of the area n at the m-th page n=1, 2, 3, 4, ..., and m≠n.

As shown in FIG. 3 (a), when the relation transform f(1) is applied to each area of the first page, and the dynamic parallel moving pointer points the result to a certain data area in a first page of another form in the same parent form, the relation area value of the certain data area is obtained as y[1]=f(1). Also as shown in FIG. 3(b), when the relation transform f(2) is applied to each area of the second page, and the dynamic parallel moving pointer points the result to a certain data area in a second page of another form in the same parent form, the relation area value of the certain data area is obtained as y[2]=f(2). As shown in FIG. 3(c), when the relation transform f(3) is applied to each data area of the third page, and the dynamic parallel moving pointer points the result to a certain data area in a third page of another form in the same parent form, the relation area value of this certain data area is obtained as y[3]=f(3).

When m takes different values (turning to different pages), the relation transform is carried to the relation area of the m-th page (m=1, 2, 3, 4 ... ), that is, the relation transform f(m) is applied to each data area of the m-th page, and the dynamic parallel moving pointer points its result to a certain data area in the m-th page of another form in the same parent form, the relation data value of the certain data area is obtained as y[m]=f(m), as shown in FIG. 3(d).

Definition of cross relation: the cross relation exists in data areas of respective forms in different parent form or the same parent form with different page numbers. The value of a certain data area is resulted from a transform of one or more other data areas. This kind of relation exists throughout the array of data areas in different forms by making reference to a certain (or some) index method, but the page numbers of different forms may be different, so it is called a cross relation. An index method between the cross relation areas should have the same index variable.

Implementation of the cross relation: a set of dynamic index pointers with the same value are constructed for some or a certain data areas, and a relation transform (for example a function operation) is applied to each of the dynamic index pointers. When the index variable values are the same, the index pointers may point to different page numbers. The data area may convey a result of the above relation transform via the index pointers to another data area of respective forms in different parent forms and their children forms or of respective forms with different page numbers in the same parent form. The data area derived from the above relation transform is referred to as a cross relation area. This kind of cross relation may be created among respective forms of all different parent forms and all their children form, or among respective form with different page numbers in the same parent form, and the created cross relation will remain throughout the array of the data areas with the same index variable values.

Figure 4:
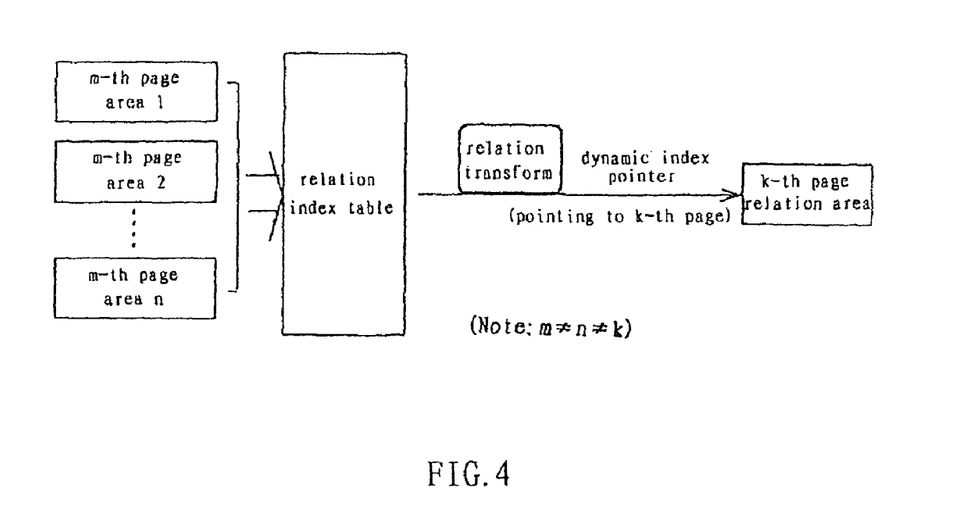
FIG. 4 is a view showing how to implement cross relations according to an exemplary embodiment of the present invention.

An implementation of the cross relation is shown in FIG. 4. For example, a relation transform is applied to area 1, area 2, ..., area n in the m-th pages of a parent form A-1 and its second children form. This relation transform for example may be to sum the area values of each area of the area 1, area 2, ..., area n. Then, the result is pointed via the index pointer to a certain data area in the k-th page of the third children form of the parent form A-e, so that the area value of this data area is the sum of the area values of each area of the area 1, area 2, ..., area n. At this time, the certain data area is referred to as the cross relation area. Thus, a cross relation is created between the second children form of the parent form A-1 and the third children form of the parent form A-e.

As shown in FIG. 4, in the embodiments of the present invention, a relation index table may be included for creating correspondence between respective relation transforms and dynamic index pointers. But the above relation index table does not construct limitations to the technical scope of the present invention, which can also be excluded from the present invention, and respective relation transforms may be created directly among the respective data areas by the operation means.

In the invention, in all the related form sets, an area value of the data area of any one form may be resulted by applying a certain transform to area values of one or more other data areas through the parallel relation or cross relation, and the one or more other data areas may be the area values of data areas of the same form or another or several other forms.

Figure 5:
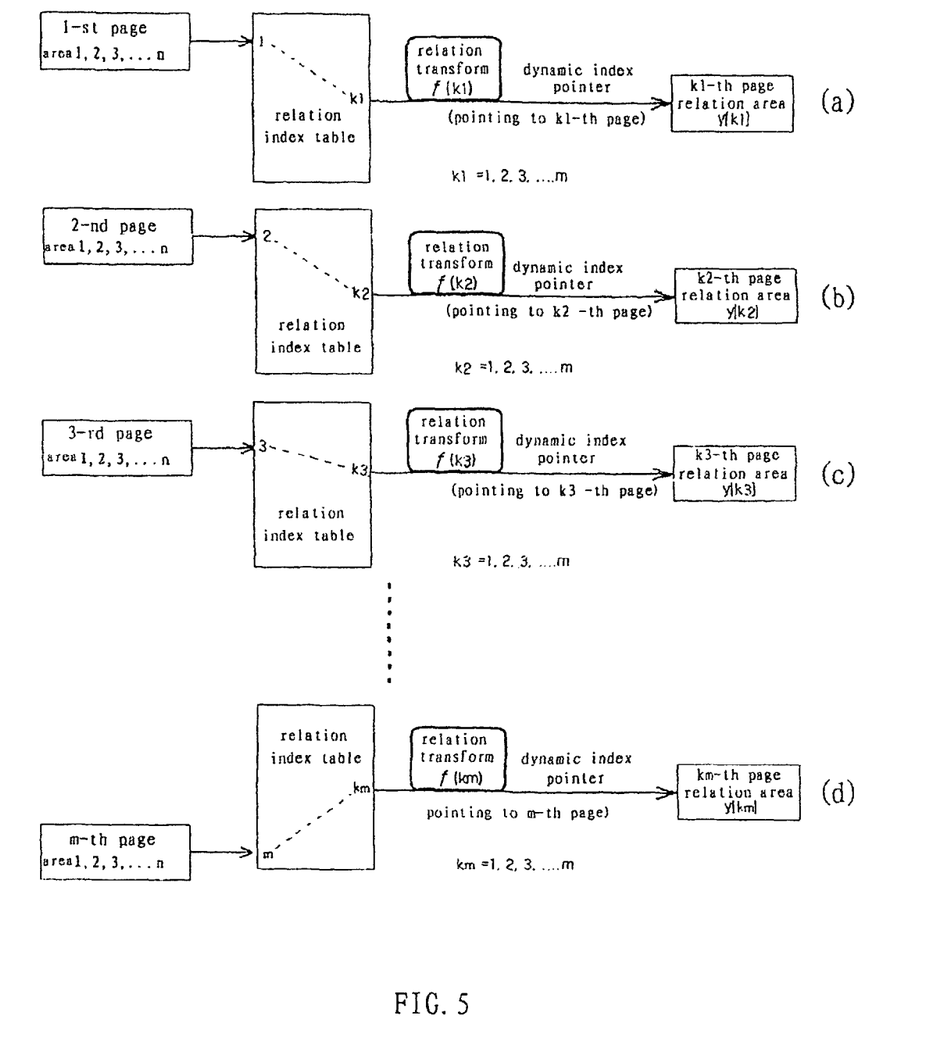
FIG. 5 is a view for exemplarily explaining the implementation of the cross relations of the present invention.

Below, the implementation of the cross relation of the present invention will be described in more details with reference FIG. 5. FIG. 5 is a view for exemplarily explaining the implementation of the cross relations of the present invention.

In the invention, let the relation transform be f(area 1[k], area 2[k], ..., area n[k]), and simplified as f(k). Let the relation area value be y[k].

Then, y[k]=f(area 1[k], area 2[k], ..., area n[k]), and simplified as y[k]=f(k).

Hereinafter, m represents the page number, and let m=1, 2, 3, 4, ...

Area n[k] is the area value of another form's area or the same form's area with different pages, which is derived by the area n at the m-th page via the relation index form.

k=1, 2, 3, 4, ....
n=1, 2, 3, 4, ....
and m≠n≠k.

As shown in FIG. 5(a), via the relation index table, data area n of the first page is pointed to a k1-th page of another form, and the relation transform f(k1) is applied to each data area (for example, area 1[k], area 2[k], ..., area n[k1]). The result is pointed via the dynamic index pointers to the relation data area in the k1-th page, and the relation area value of the relation data area is obtained as y[k1]=f(k1). Also as shown in FIG. 5(b), via the relation index table, data area n of the second page is pointed to a k2-th page of another form, and the relation transform f(k2) is applied to each data area (for example, area 1[k2], area 2[k2], ..., area n[k2]). The result is pointed via the dynamic index pointers to the relation data area in the k2-th page, and the relation area value of the relation data area is obtained as y[k2]=f(k2). Also as shown in FIG. 5(c), via the relation index table, data area n of the third page is pointed to a k3-th page of another form, and the relation transform f(k3) is applied to each data area (for example, area 1[k3], area 2[k3], ..., area n[k3]). The result is pointed via the dynamic index pointers to the relation data area in the k3-th page, and the relation area value of the relation data area is obtained as y[k3]=f(k3).

When m takes different values, the pointer resulted from the relation index will point to the relation area of the km-th page (m≠km). The relation transform is carried to the relation area of the km-th page with the dynamic index pointers, and the relation area value of the km-th page is obtained as y[km]=f(km), as shown in FIG. 5(d).

Figure 6:
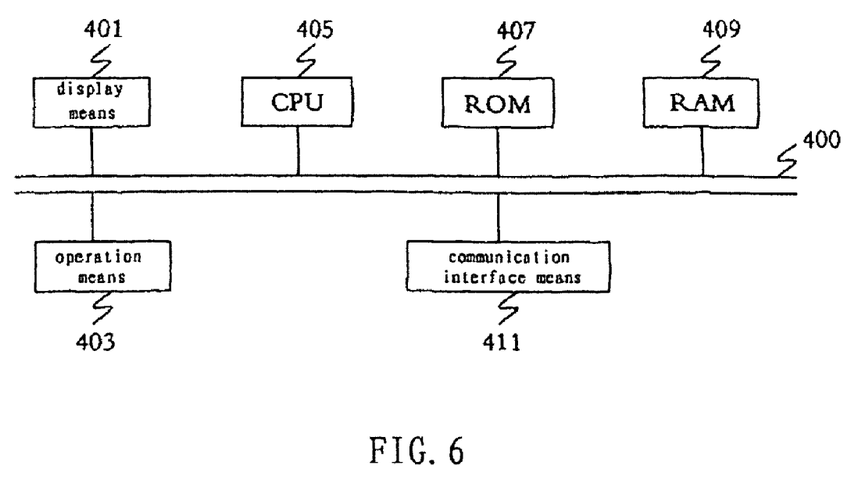
FIG. 6 is a block diagram showing hardware configurations for implementing the present invention.

Hereinafter, a device for implementing the present invention is described with respect to the drawings. FIG. 6 is a structural block diagram of the device for creating the relation-type form database according to the present invention.

As shown in FIG. 6, the device according to embodiments of the present invention includes a bus 400, and a display means 401, an operation means 403, a central processing unit (CPU) 405, a read-only memory (ROM) 407, a random access memory (RAM) 409 and a communication interface means 411 that are connected to the bus 400, and may also include other types of storage devices (not shown).

The above display means 401 may be, for example, a display of a computer for displaying on its display screen a background image obtained by scanning the existing forms. The operation means 403 may be various input devices such as mouse, keyboard, input tablet, and the like, for operating the computer, and is used to draw frames on predetermined positions on the background image to create multiple data areas, and under control of the control devices (such as CPU 405, ROM 407, and RAM 409), create parallel relations and/or cross relations among the multiple data areas.

The central processing unit 405 is adapted to run various programs to control operations of each means in the device of the present invention. For example, CPU 405 receives an instruction to draw a frame on the background image from the operation means 403, displays the drawn frame on the screen of the display means 401, and in response to an instruction to create parallel relations and/or cross relations from the operation means 403, creates the parallel relations and/or cross relations among the data areas of respective forms in the form set. The read-only memory 407 is adapted to store various programs required by the central processing unit 405. The random access memory 409 is adapted to store intermediate data generated in the operations of the central processing unit 405, etc.

The communication interface means 411 is adapted to connect the device of the invention to an external device (not shown) for communicating with the external device. For example, the communication interface means 411 receives the scanned form images from an external scanner (not shown), and stores the received form images in a storage device (not shown) of the device of the present invention under the control of CPU 405.

In an embodiment of the invention, the data areas are empty areas to be filled where the content to be filled is at least one of text, number, pattern, function, dynamic image, and movie.

In an embodiment of the invention, the form set contains at least a parent form and a plurality of children form thereof, and the data areas where the same record is recorded in the parent form and the children form are assigned the same page number.

In an embodiment of the invention, the operation means 403 is further configured to construct a set of dynamic parallel moving pointers for a specified data area, apply a relation transform to each of the dynamic parallel moving pointers where the relation transform acts between the parent form and the children forms thereof with the same page number, and subject the area value of the data area to the relation transform and transfer it to another data area. When the page numbers are different, the dynamic parallel moving pointers transfer in parallel the relation transform to different pages (records). The above another data area is referred to as the parallel relation area. For example, when the data area is located on the first page of the child form 2 of the parent form A-1, the parallel relation area may be located in the first pages of the parent form A-1 and its respective children forms 2 to n.

In an embodiment of the invention, the operation means 403 is further configured to construct a set of dynamic index pointers with the same value for a specified data area, and apply a relation transform to each of the dynamic index pointers which may point to different page numbers, subject the area value of the data area to the relation transform and transfer it to another data area of respective forms in a different parent form and the children forms thereof, or of respective forms with different page numbers in the same parent form (records). When the index values are different, the dynamic index pointer transfers the relation transform to different pages (records). The above another data area is referred to as the cross relation area. For example, when the data area is located on the first page of the child form 2 of the parent form A-1, the parallel relation area may be located in other pages of the parent form A-1 and its respective children forms 2 to n, or be located in all pages of the parent form A-e and its respective children forms.

Figure 7:
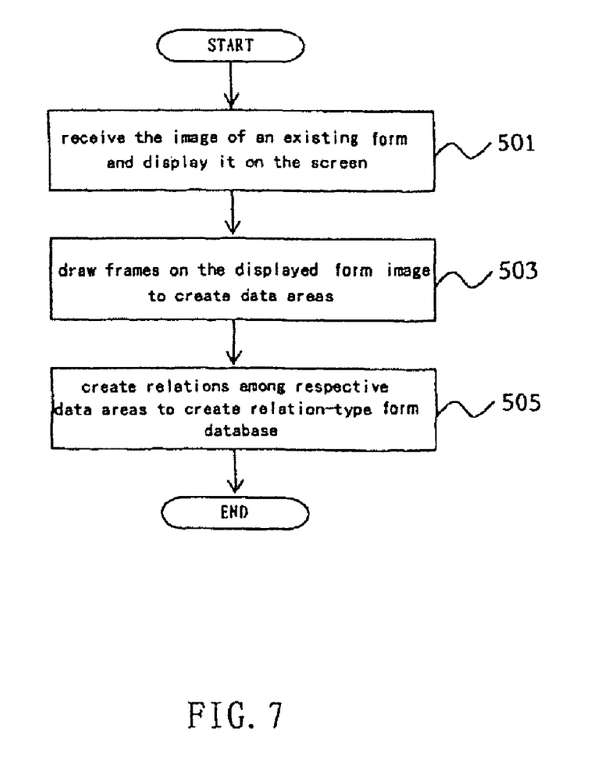
FIG. 7 is a flowchart of steps of the method implementing the present invention.

Hereinafter, a method of implementing the present invention is described with respect to the drawings. FIG. 7 is a flowchart of the method of implementing the present invention.

As shown in FIG. 7, at step 501, an existing form is displayed on a screen as a background image. The background image may be resulted from images scanned the existing form by a scanner and stored in the storage device (not shown) in the device 6 of the present invention, or resulted from hard copies of computer images, or image files of the forms that have been stored in a storage of the computer.

At step 503, multiple data areas are created by drawing frames on predetermined positions of the background image with the operation means 403 (for example, mouse). In an embodiment of the invention, the data areas are empty areas to be filled where the content to be filled is at least one of text, number, pattern, function, dynamic image, and movie.

At step 505, parallel relations and/or cross relations are created among the multiple data areas to create the relation-type form database system according to embodiments of the present invention. Then, the above process ends.

In an embodiment of the invention, the form set contains at least a parent form and its children forms, in which the data areas where the same record is recorded are assigned the same page number.

In an embodiment of the invention, the step of creating the parallel relations in the step 505 further comprises: constructing a set of dynamic parallel moving pointers for a specified data area, applying a relation transform to each of the dynamic parallel moving pointers where the relation transform acts between the parent form and the children form thereof with the same page number, and subjecting the area value of the data area to the relation transform and transferring it to another data area. When the page numbers are different, the dynamic parallel moving pointers transfer in parallel the relation transform to different pages (records).

In an embodiment of the invention, the step of creating the cross relations in the step 505 further comprises: constructing a set of dynamic index pointers with the same value for a specified data area, applying a relation transform to each of the dynamic index pointers which may point to different page numbers, subjecting the area value of the data area to the relation transform and transferring it to another data area of respective forms in different parent form and the children form thereof, or of respective form with different page numbers in the same parent form (records). When the index values are different, the dynamic index pointers transfer the relation transform to different pages (records).

In the above, the embodiments of the present invention have been described by way of examples.

Applications of the present invention are very wide, and for simplicity, in that (1) for organizations such as, for example, government departments, financial enterprises, intermediate and small academy, public organizations, and the like, that have established databases, if the present invention is applied, work amount in software programming of IT departments will decrease by 70%-90%, and the larger the organization is, the more the benefit is; (2) for the many intermediate and small enterprises that have not established databases, the databases will not be specific to the large enterprises or "noble" enterprises, and any employee of these enterprises with a few knowledge about computers can create the databases directly with the existing forms without programming and maintenance by professionals, so the computer management levels of the intermediate and small enterprises can be improved under the existing conditions, resulting in growth in additional value and its competitions; (3) it is easy to use and operate for a student in middle school having general computer knowledge after training of 1-3 days. Application of the present invention is not limited by the applied fields.

Although respective embodiments of the present invention have been described in details above, it will be obvious for those skilled in the art that further modifications and improvements may be made to the present invention. It shall be appreciated that such modifications and improvements are also within the spirit and scope of the present invention.

What is claimed is:

1. A method of creating a relation-type form database, comprising:

displaying an existing form as a background image on a screen;

drawing frames on predetermined positions of the background image with an operation device to create multiple data areas; and creating parallel relations or cross relations among the multiple data areas, wherein the form contains at least one parent form and children forms thereof in which data areas where the same record is recorded are assigned the same page number, when the parallel relations exist, the parallel relations exist between the data areas in the parent form and its children forms with the same page number, and a value of one of the data areas in the parallel relations is a result of transformation from another one of the data areas, and wherein in the parallel relations, the data areas with relations between the parent form and the children forms are assigned the same page number, and when the cross relations exist, the cross relations exist between the data areas in respective forms in different ones of the parent forms or the same parent form with different page numbers, and a value of one of the data areas in the cross relations is a result of transformation from another one of the data areas, and wherein in the cross relations, the data areas with relations between the parent form and the children forms thereof and another parent form and the children forms thereof are assigned the same page number or different page numbers, wherein the step of creating the cross relations comprises: constructing a set of dynamic index pointers with the same value for a specified data area, applying a relation transform to each of the dynamic index pointers, wherein the dynamic index pointers subject the area value of the data area to the relation transform, and transferring it to another data area of respective forms in different parent forms and the children forms thereof or of respective forms with different page numbers in the same parent form, and when index values are different, the dynamic index pointers transfer the relation transform to different pages.

2. The method of claim 1, wherein the data areas are empty areas to be filled where the content to be filled is at least one of text, number, pattern, function, dynamic image, and movie.

3. The method of claim 1, wherein the step of creating the parallel relations comprises: constructing a set of dynamic parallel moving pointers for a specified data area, applying a relation transform to each of the dynamic parallel moving pointers where the relation transform acts between the parent form and the children forms thereof with the same page number, subjecting the area value of the data area to the relation transform, and transferring it to another data area, and wherein when page numbers are different, the dynamic parallel moving pointers transfer in parallel the relation transform to different pages.

4. The method of claim 1, wherein the background image is obtained by scanning the existing forms.

5. The method of claim 1, wherein the background image is an image file stored in a storage device, and the format of the image file being at least one of BMP, JPEG, TIFF, PNG, GIF, and PD.

6. A device for creating a relation-type form database, comprising:
 a display means for displaying an existing form as a background image on a screen; and
 an operation means for drawing frames on predetermined positions of the background image to create multiple data areas, and creating parallel relations or cross relations among the multiple data areas, wherein
 the form contains at least one parent form and children forms thereof in which data areas where the same record is recorded are assigned the same page number,
 when the parallel relations exist, the parallel relations exist between the data areas in the parent form and its children forms with the same page number, and a value of one of the data areas in the parallel relations is a result of transformation from another one of the data areas, and wherein in the parallel relations, the data areas with relations between the parent form and the children forms are assigned the same page number, and
 when the cross relations exist, the cross relations exist between the data areas in respective forms in different ones of the parent forms or the same parent form with different page numbers, and a value of one of the data areas in the cross relations is a result of transformation from another one of the data areas, and wherein in the cross relations, the data areas with relations between the parent form and the children forms thereof and another parent form and the children forms thereof are assigned the same page number or different page numbers,
 wherein the operation means is further configured to construct a set of dynamic index pointers with the same value for a specified data area, apply a relation transform to each of the dynamic index pointers, wherein the dynamic index pointers subject the area value of the data area to the relation transform, and transfer it to another data area of respective forms in different parent forms and the children forms thereof or of respective forms with different page numbers in the same parent form, wherein when index values are different, the dynamic index pointers transfer the relation transform to different pages.

7. The device of claim 6, wherein the data areas are empty areas to be filled where the content to be filled is at least one of text, number, pattern, function, dynamic image, and movie.

8. The device of claim 6, wherein the operation means is further configured to construct a set of dynamic parallel moving pointers for a specified data area, apply a relation transform to each of the dynamic parallel moving pointers where the relation transform acts between the parent form and the children forms thereof with the same page number, subject the area value of the data area to the relation transform, and transfer it to another data area, wherein when page numbers are different, the dynamic parallel moving pointers transfer in parallel the relation transform to different pages.

9. The device of claim 6, wherein the operation means is at least one of mouse, keyboard, tablet.

* * * * *